March 18, 1952    C. F. ROOT    2,590,042
APPARATUS FOR PRODUCING CURVED OR PLANE SURFACES
Filed Dec. 4, 1946    3 Sheets-Sheet 2
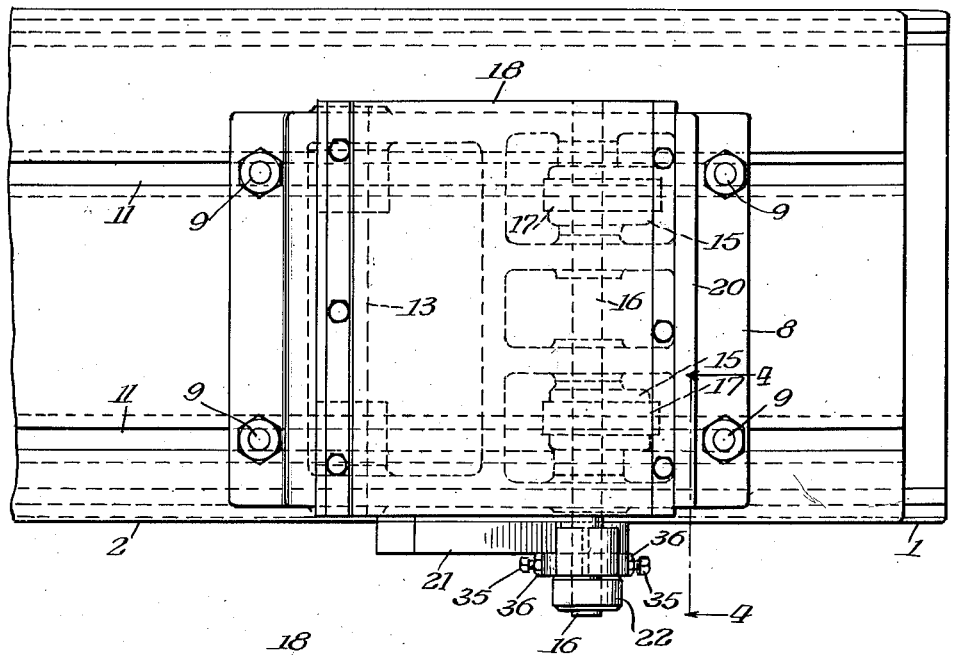
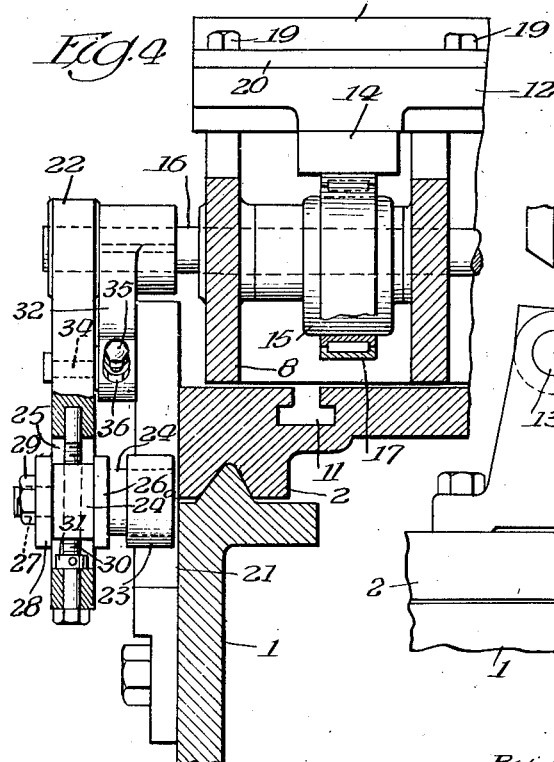
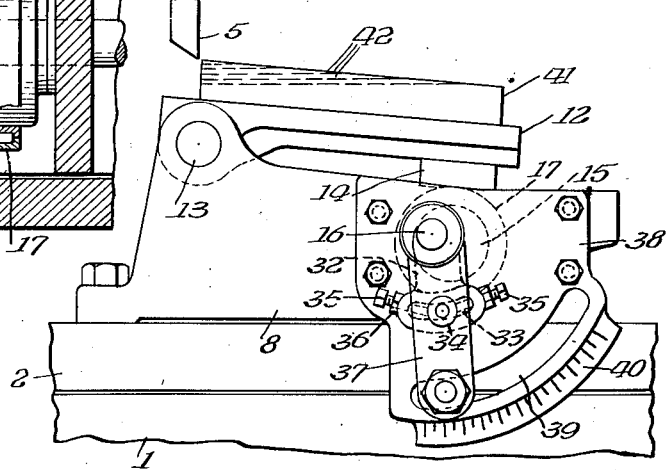
Inventor
Charles F. Root
By Spencer, Marzall, Johnston & Cook
attys.

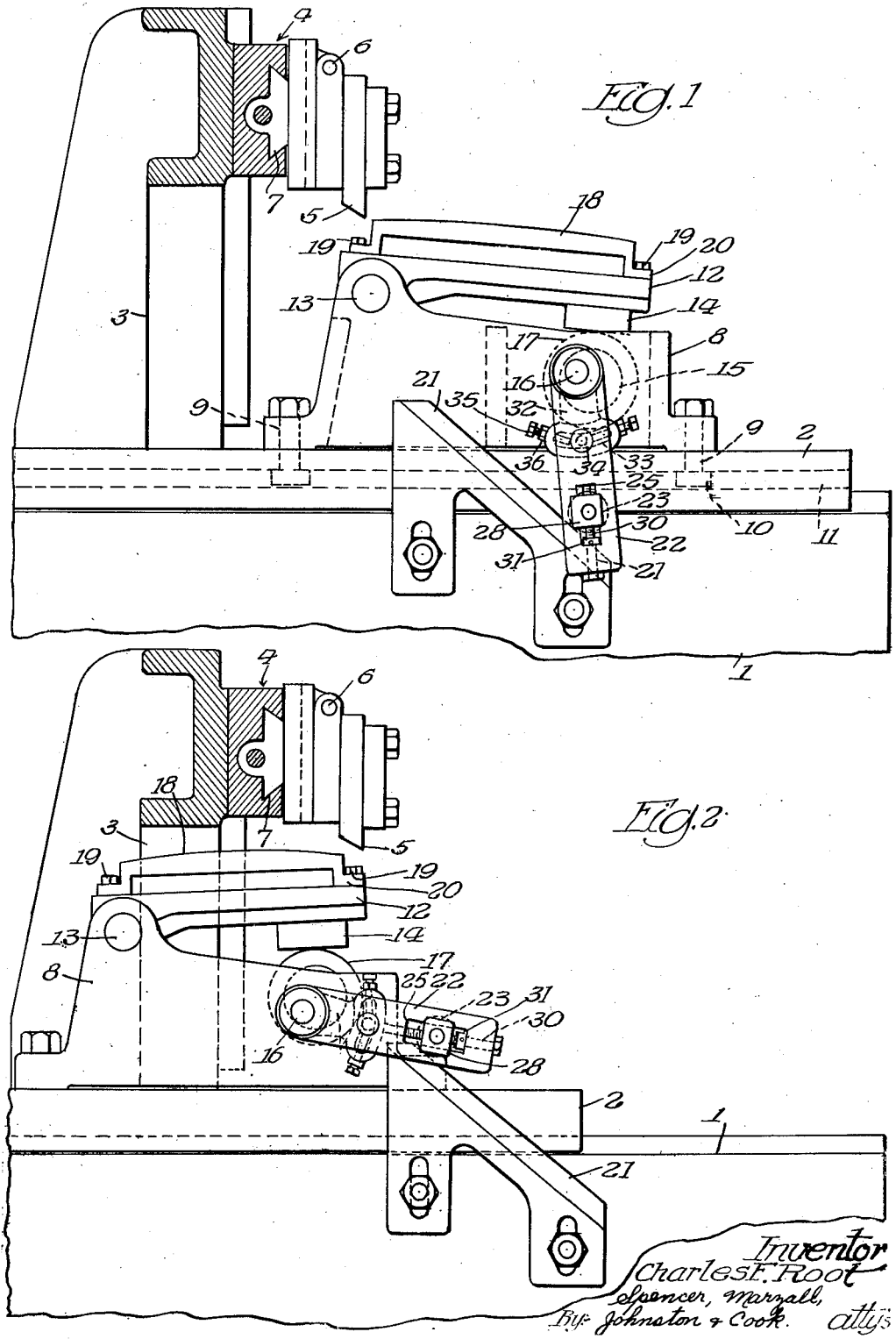

March 18, 1952 C. F. ROOT 2,590,042
APPARATUS FOR PRODUCING CURVED OR PLANE SURFACES
Filed Dec. 4, 1946 3 Sheets-Sheet 3
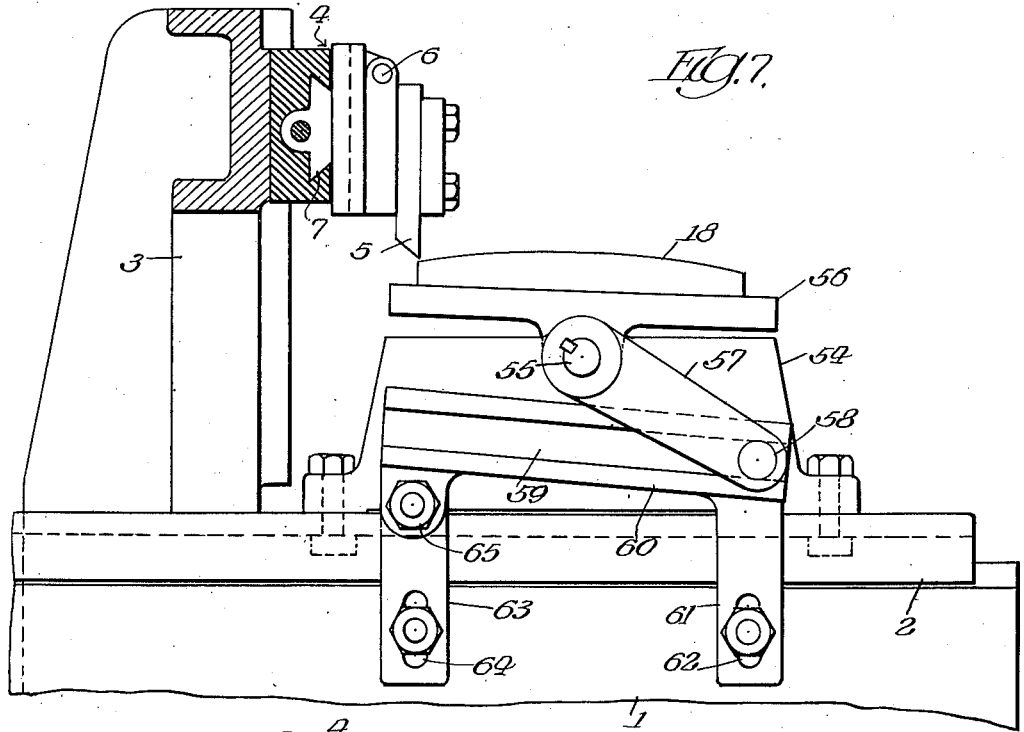
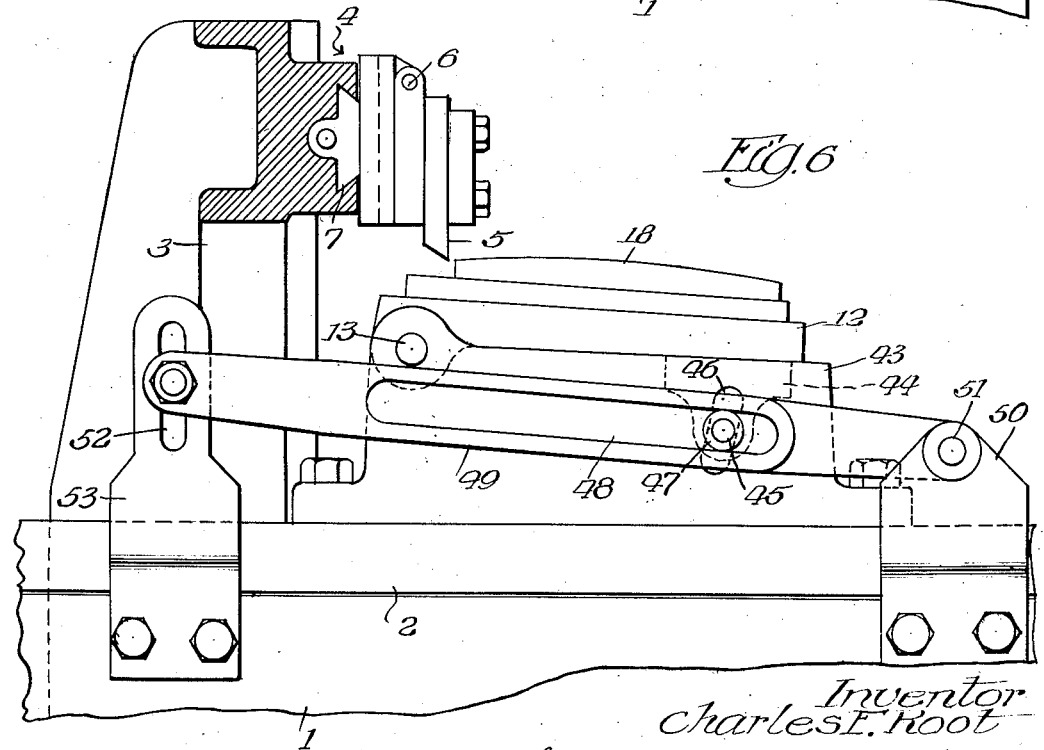
Inventor
Charles F. Root
By Spencer, Marzall, Johnston & Cook, Attys Patented Mar. 18, 1952

2,590,042

UNITED STATES PATENT OFFICE 2,590,042

APPARATUS FOR PRODUCING CURVED OR PLANE SURFACES

Charles F. Root, Cleveland, Ohio, assignor to The Chandler & Price Company, Cleveland, Ohio, a corporation of Ohio Application December 4, 1946, Serial No. 713,886

9 Claims. (Cl. 90—26)

This invention relates in general to apparatus for forming or finishing curved surfaces on a piece of material or work, and which is also adapted for the forming of plane surfaces on work which is positioned at an angle with respect to the horizontal.

While the basic idea may be embodied in a separate machine if so desired, one of the great advantages of the apparatus is that it may be applied as a fixture to a planer or surface grinder or any other suitable type of machine where there is relative movement between the work and the tool operating thereon. When the apparatus is applied as a fixture to a planer or surface grinder, the machine operates in the usual and well known manner where the tool is stationary and the work moves thereagainst. On the other hand, the illustrated embodiment of the invention may be so modified as to be applied to other machines, such as shapers, where the work is stationary and the tool moves thereagainst. The invention is primarily concerned with the forming of curved surfaces, but the preferred form of the invention may also be utilized with slight modification, to form a plane surface on work which is disposed at an angle with respect to the horizontal.

One of the principal objects of the present invention is to provide an apparatus which will plane or otherwise form or finish either a curved surface, or a plane surface where the work operated upon is disposed at an angle with respect to the horizontal.

Another object of the invention is to provide an apparatus which may have embodied therein suitable adjusting means whereby curved surfaces of any desired radius may be formed within reasonable limits.

A further object of the invention is to provide a fixture which may be attached to well known machines such as planers or surface grinders whereby, when the bed of the machine reciprocates in a horizontal plane, the work which is attached thereto and which comes in contact with the tool, will have a curved surface formed thereon.

Still another object of the invention is to provide an apparatus or fixture wherein the base thereof carries a pivotally mounted work support, and suitable means are provided for moving the work and its support through an arc of a predetermined radius during reciprocation of the base in a horizontal plane.

A still further object of the invention is to provide a fixture for planing, grinding or otherwise forming curved surfaces on a piece of work, where the work is mounted on a horizontally reciprocating base and is caused to move through an arc during such reciprocation by means of eccentrics or the like which are actuated during such reciprocation.

Still another object of the invention is the provision of a fixture or apparatus for forming plane surfaces on work which is positioned at an angle with respect to the horizontal, wherein suitable adjusting means is provided to support the work and the work support at a predetermined angle so that a reciprocation of the work with respect to the tool operating thereon will produce a flat or plane surface which will be at an angle with respect to the horizontal when the work is completed.

Other objects and advantages of the invention will become apparent upon reading the following description taken in connection with the accompanying drawings in which:

Fig. 1 is a side elevational view of the fixture of the present invention as applied to a planer wherein the reciprocating base is shown in position at the beginning of the stroke;

Fig. 2 is a view similar to Fig. 1 but showing the base and work at the end of the stroke;

Fig. 3 is a plan view of the fixture shown in Fig. 1;

Fig. 4 is a fragmentary vertical sectional view taken substantially along the plane of line 4—4 of Fig. 3;

Fig. 5 is a fragmentary side elevational view of a form of the invention showing the angle adjustment for forming plane surfaces on work positioned at an angle with respect to the horizontal;

Fig. 6 is a view similar to Fig. 1 showing a modified form of fixture; and

Fig. 7 is a view similar to Fig. 1 but showing a still further modified form of fixture.

As stated above, the apparatus of the present invention involves the principle of rotating a piece of work through an arc while either the work or a tool operating thereon reciprocates. The illustrated embodiment moves the work through an arc in one direction while reciprocating in another direction whereby the resulting surface formed is curved. The use to which a piece of metal may be put which has one side thereof curved in accordance with the present invention is of minor importance but one of the main uses has been in the production of curved platens for job platen printing presses. When used for this purpose, it is highly important that the curvature be equal and accurate at all points along the length of the curve and the apparatus of the present invention has produced such curved surfaces on a piece of work in a highly efficient and satisfactory manner.

For purposes of illustration I have shown the apparatus of my invention as it may be applied as a fixture to a planer, but this is in no way intended to be limiting, since the identical fixture can be embodied equally as well in a separate machine or in other types of machines such as surface grinders.

The fixture as disclosed herein embodies a work support which is pivotally mounted on a horizontally reciprocating base member. The work is mounted on the support and is caused to move in contact with the tool for cutting the surface. Various means may be provided for moving the work and its support through a suitable arc during the reciprocating movement thereof and for synchronizing the arcuate movements thereof whereby a true arc of a circle results of any predetermined radius. The preferred form of the invention is illustrated in Figs. 1 through 4, where eccentrics are utilized to impart an arcuate movement to the work and its support during reciprocation thereof by suitable means which causes a rotation of said eccentrics.

Referring now more particularly to the drawings and especially to Figs. 1 through 4 where the invention is disclosed as a fixture applied to a well known form of planer, the numeral 1 indicates the planer base wherein the planer bed 2 is suitably mounted thereon for horizontal reciprocation. Any suitable and well known means may be utilized for imparting a reciprocating movement to the planer bed.

The planer has the usual upstanding members 3 at each side of the bed for the purpose of supporting a head, generally indicated by the numeral 4. The cutting tool 5 is pivotally mounted at 6 on the head by means of a suitable holder so that movement of the bed toward the left will be the cutting stroke and movement thereof toward the right will permit the tool to slide freely over the work, in the customary way.

The tool support is suitably mounted on the head by means of a dove-tailed connection 7 whereby it may move transversely of the work and the entire assembly is so mounted as to move downwardly a small amount for the next cut after the cutting has proceeded throughout the width of the work. This is all in accordance with the old and well known practice, and further description of the planer is not believed to be necessary at the present time.

The apparatus of the present invention consists of a fixture base 8 which may be secured to the planer bed 2 for movement therewith by any suitable means such as for example, the bolts 9 having heads 10 thereon received within T-slots 11 extending longitudinally of the bed 2. The work support 12 is pivotally mounted at one end thereof on the shaft 13 for arcuate movement about a horizontal axis, and carries a pair of blocks 14 at the underside of the free end thereof. A pair of eccentrics 15 are keyed to a transversely extending shaft 16 between the sides of the fixture base 8, which eccentrics have mounted thereon roller bearings 17. The eccentrics and roller bearings are disposed immediately below the blocks 14 so that the blocks will rest thereon and movably support the work support 12. It will be evident that from the position of the eccentrics shown in Fig. 1, if they are caused to rotate in a counter-clockwise direction, they will elevate one end of the work support 12 causing it to move through an arc about the pivotal point 13 at the opposite end thereof.

The work which is to be cut by the tool is indicated at 18 and may be mounted on the work support in any desired manner. One form which the securing means may take involves the use of bolts 19 extending downwardly through flanges or ears 20 of the work into the work support. The means for holding the work in place forms no part of the present invention and any suitable means commonly used for securing work on a planer may be used. When the eccentrics 15 carrying the roller bearings 17 are caused to rotate in a counter-clockwise direction, they will elevate the work support 12 carried thereby and if this elevation is caused to occur at the proper time during the cutting of the surface, the result will be a surface having a predetermined radius of curvature.

It is important that this elevation or arcuate movement of the work take place in properly timed relation with the movement of the work against the tool in order for the result to be a true curve having the high-point thereof exactly at the center between the two ends of the work.

In order to accomplish this result I provide a cam track 21 which may be mounted on the side of the planer base and which, in the embodiment shown, is preferably located at an angle of approximately 45°.

The downwardly extending arm 22 is freely mounted at its upper end on the outer end of the shaft 16. The lower part of the arm 22 carries a cam follower 23 adapted to ride along the cam track 21 during the reciprocating movement of the fixture base. The cam follower 23 is mounted on a stud 24 which is an integral part of a block 24a located within a slot 25 in the arm 22, which carries a flange 26 abutting against the inner side of said arm. The other side of the block 24a carries a threaded member 27. The entire assembly may then be easily secured in any suitable location between the ends of the slot 25 by placing a washer 28 around the threaded member 27 and tightening it against the arm 22 by means of a nut 29. Thus, changing the location of the stud 24 within the slot 25 will alter the position of the cam follower 23 with respect to the cam track 21 and thereby providing one of the adjustments for determining the radius of curvature to be cut. To enable a fine adjustment to be made of the location of the stud carrying the cam follower 23, an elongated adjusting screw 30 is provided which extends upwardly from the bottom of the arm 22, through the slot 25 and the block 24a, and into the arm again at the upper end of the slot where it is supported for free turning movement. A collar 31 is suitably mounted on the screw 30 at the lower end of the slot for turning movement therewith, but preventing any longitudinal movement of the screw. Thus it will be evident that turning the screw 30 will raise or lower the stud 24 and the cam follower 23 carried thereby and will thus afford an adjustment to determine the radius of curvature to be cut.

Another adjustment which determines the location of the high point of the arc by regulating the starting position of the eccentrics includes a downwardly depending arm 32 keyed to the shaft 16 at its upper end. The lower end of the arm 32 is provided with an arcuate slot 33 adapted to receive a stud 34 having its head pressed into the outer side of the arm 22. Adjusting screws 35 extend inwardly from each end of the slot 33 and carry lock nuts 36, whereby the ends of the screws 35 will normally contact the sides of the stud 34 to hold it in position. Adjustment of the screws 35 is for the purpose of rotating the arm 32 either toward the right or toward the left. When an adjustment is made moving the arm toward the right, the eccentrics 15 carrying the roller bearings 17 will be moved in a counter-clockwise direction by reason of the fact that said arm 32 is keyed to the shaft 16 on which the eccentrics are mounted. Thus it will be evident that the initial adjustment as to the elevation of the work and the work support may be made for determining the location of the arc and its high-point with respect to the work.

As the fixture base 8 is caused to reciprocate horizontally, and as it moves toward the left, the arms 22 and 32 mounted on the shaft 16 will be carried therewith. As movement toward the left continues, the lower end of the arm 22 will be moved upwardly causing this arm to rotate in a counter-clockwise direction as the cam follower 23 moves upwardly on the cam track 21 to its final position at the end of the stroke as shown in Fig. 2. Such movement of the arm 22 will carry with it the arm 32 by reason of the stud 34 extending between the two arms and secured in place by the bolts 35. The arm 32 being keyed to the shaft 16, such movement will cause the shaft and the eccentrics mounted thereon to rotate in a counter-clockwise direction thus elevating the outer free end of the work support 12 and the work 13 carried thereby. The resulting cut taken by the tool in the work will be arcuate or curved as indicated in Figs. 1 and 2. The contour of the surface being cut may, of course, be varied by altering the contour or the angularity of the cam track or the arm adjustments to thus obtain any desired surface, either regular or irregular.

Another advantage of this form of the invention is that it may be adapted for use in the planing of flat surfaces on work which is positioned at an angle with respect to the horizontal. It has been customary in the past to place the work on blocks or other supporting means located under one end thereof on the work support in order to elevate the work to the desired angle for the forming of a flat surface thereon. The reasons for planing or otherwise forming such a surface may be many, for example, if a piece of material is to have opposing parallel surfaces in its completed form and the casting is wider or thicker at one end than at the other. It may also be desirable in certain instances to produce a piece of material having a flat surface on one side thereof and another flat surface at the other side but disposed angularly with respect to each other. In either event, the basic principle of the present invention may be utilized to so position the work initially without resorting to additional blocks to dispose the work angularly. In other words, in the present device, the work may still be placed directly on the work support and secured thereto in the same manner described above, but the work support may be given an initial angular position with respect to the horizontal and secured in that position during the reciprocating movement of the fixture base.

The manner of operation of this form of the invention may be more clearly understood by reference to Fig. 5 wherein again the fixture has been illustrated as being applied to a planer. For the most part, the various members described above in referring to Figs. 1 through 4 are utilized here and for purposes of convenience similar reference numerals have been used to indicate similar parts. In this case, the planer base, planer bed, the fixture base, the work support and the eccentrics which elevate one end thereof are all identical with the parts shown in Fig. 1.

The fixture base 8 has the same shaft 16 extending between the sides thereof on which are mounted the eccentrics 15 which have the roller bearings 17 secured thereto for the purpose of bearing against the blocks 14 in their rotary movement. The same arm 32 is keyed to the shaft 16 and is provided at its lower end with an arcuate slot 33 through which a stud 34 passes for purposes of adjustment by means of the bolts 35. The downwardly extending arm which is loosely mounted on the shaft 16, however, is indicated by the numeral 37 and may be slightly modified from the arm 22 although this is not necessary. The cam track 21 may be removed from the side of the planer base 1 and in its place a member 38 is mounted directly on the side of the fixture base 8, which member carries an arcuate slot 39 and an arcuate plate 40 having suitable indicia thereon to indicate the angle at which the work support 12 is to be located.

The cam follower 23 shown in Fig. 4 or other desired guide and clamping means may be suitably carried on the arm 37 to clamp the arm 37 at any desired location within the slot 39. The work is indicated at 41 as being mounted by any of the well known and usual means on the work support 12. It will be noted that the work is mounted directly thereon and is not blocked up as is customary at the present time. It may first be determined at what angle the upper surface is to be with respect to the horizontal or bottom of the work, and the arm 37, carrying with it the arm 32 keyed to the shaft 16, may be rotated and clamped to the member 38 within the slot 39. As this rotation occurs, the roller bearings 17 mounted on the eccentrics 15 will cause the work support 12 to be elevated or lowered in accordance with the direction of movement thereof. When the proper angle of the work support 12 has been determined and it has been secured in that position, the planer may then be caused to operate to reciprocate the fixture base 8. The actual cuts which are taken successively in the work 41 and which are indicated at 42 will, of course, be horizontal cuts because the fixture base reciprocates in a horizontal plane. However, at the end of the planing operation, the resulting surface will be located at an angle with respect to the underside of the work so that when the work is placed in a horizontal position, the surface which has been planed will be located at an angle with respect to the horizontal.

After planing or otherwise forming or grinding a flat surface as just described, it may then be possible to form a curved surface on another piece of work in the manner described hereinbefore by merely removing the member 38 and replacing the cam track 21, after which time the machine will operate to produce a curved or other type of surface corresponding to the cam track 21.

The inventive concept resides in the constant and gradual rotation of the work through an arc for the production of a curved surface. The actual apparatus which may be utilized to produce this result may assume various specific forms and as illustrative of such modified forms, I have disclosed herein the devices shown in Figs. 6 and 7, both of which utilize the basic principles described above with respect to the preferred forms shown in Figs 1 through 4.

It will also be understood with respect to these modified forms that the devices are applicable for use as a fixture in conjunction with a planer, a surface grinder, or any other suitable type of existing machine for the production of curved surfaces and in the illustrated embodiment, the apparatus has been disclosed as a fixture to be applied to a planer.

In Fig. 6, the usual planer has been indicated, the parts thereof bearing the same reference numbers as similar parts shown in Fig. 1. In this form of the invention the fixture base is indicated by the numeral 43 and is suitably secured to the planer bed 2 so as to reciprocate horizontally therewith. Instead of the eccentrics previously described, however, the underside of the work support 12 is provided with supporting blocks 44 adapted to support a horizontally disposed shaft 45 which extends outwardly through arcuate slots 46 located in each side of the fixture base. The outer ends of the shaft 45 carry roller bearings 47 each of which is adapted to ride in an elongated slot 48 located in an arm 49 extending in an angular position along each side of the planer.

Suitable adjustable supporting means for the arms 49 are provided and include a supporting member 50 at each side of the machine which has one end thereof adapted to pivotally support the arm 49 at 51, while the other end of the arm 49 is adapted to be clampingly secured by any suitable means within a substantially vertically extending slot 52 in the supporting member 53.

The initial angle at which the arms 49 are to be disposed may be determined by elevating or lowering the outer free ends thereof and then securing them in place. The arms remain stationary during operation of the machine, and as the fixture base 43 moves forwardly in a horizontal plane and carries with it the work support 12 and the work 18 mounted thereon, the rollers 47 will move along the slots 48. In the present illustration, one arm 49 and its slot 48 is shown in position where the forward end thereof is elevated above the rear end. It will thus be evident that the roller 47 will climb upwardly as the fixture moves forwardly, and since the roller 47 is mounted on the shaft 45 connected to the work support 12, said work support and the work carried thereby will also be elevated. Thus it will be evident that the work will again have imparted thereto a horizontal and vertical movement simultaneously and in the proper timed relation and amount so that the stationary tool 5 will cut on an arc with respect to the work, thus producing a curved surface thereon.

The form of the device shown in Fig. 7, while embodying the same general principles heretofore described, is designed to pivot or rotate the work about its center rather than at one end thereof. In this form of the invention the fixture base is indicated by the numeral 54 and carries a horizontally disposed shaft 55 suitably journaled in bearings centrally located between the ends of the work support 56. The work 18 may be secured to the work support by any common and well known means.

One end of the shaft 55 has keyed thereto an arm 57 which extends downwardly and toward the right as viewed in Fig. 7, the other end of which arm carries a roller 58 adapted to ride in a cam slot 59 located in a cam member 60. This member and the slot therein is so disposed as to cause the roller 58 to climb upwardly as the fixture reciprocates with the planer bed. From the position of the various parts as shown in Fig. 7, it will be evident that as the fixture moves toward the left, the roller 58 will move upwardly to rotate the arm 57 in a counter-clockwise direction. Such movement of the arm will likewise cause a rotation of the shaft 55 in a counter-clockwise direction carrying with it the work support 56 and the work 18 mounted thereon. Thus it will be evident that a similar simultaneous horizontal and vertical movement of the work takes place in such timed relation and in such amount or degree as to cause the tool 5 to produce a curved surface thereon.

The member 60 is adjustably mounted for the purpose of causing the rotation of the arm 57 and shaft 55 at a greater or lesser speed which, in turn, determines the radius of curvature of the resulting arcuate surface. To the accomplishment of this result, I mount the member 60 at one end thereof to an upwardly extending support 61 which has a suitable vertical adjustment within the slot 62. A second upwardly extending support 63 is also provided with a slot 64 for the vertical adjustment of the member 60 at the other end thereof. The member 60 may be suitably secured to the support 63 by the clamping means 65 and the opposite end thereof may be pivotally secured to the support 61 so that any suitable adjustment as to angularity of the cam groove 59 may be easily made.

From the foregoing description it will be evident that the present invention involves the use of novel mechanical expedients for the accurate and simple production primarily of curved surfaces, but the principle of which can be used as well for angularly positioning a piece of work on which a flat surface may be produced. The preferred form of the invention is admirably suited to be changed quickly from its adaptation to form curved surfaces to one for the production of flat surfaces. While any or all forms of the invention disclosed may be embodied in a separate and complete machine, one of the advantages of each form is that it may be applied as a fixture to existing conventional machines, such as planers, surface grinders and the like.

It will also be clear that changes may be made in the form, construction and arrangement of parts from any of those disclosed herein without in any way departing from the spirit of the invention or sacrificing any of the attendant advantages thereof, provided, however, that such changes or modifications fall within the scope of the claims appended hereto.

Having thus described my invention what I claim as new and desire to secure by Letters Patent of the United States is:

1. A fixture adapted to be applied to a machine wherein a tool performs an operation on work carried by a reciprocating base, said fixture comprising a work support pivotally mounted on the reciprocating base, stationary cam means located at one side of said base, a cam follower mounted on said base and adapted to follow the contour of said stationary cam means during reciprocation of said base, and means actuated by the movement of said cam follower during reciprocation of said base to rotate said work support and the work carried thereby in an arcuate path, whereby an arcuate path will be traversed by the tool with respect to the work.

2. A fixture adapted to be applied to a machine wherein a tool performs an operation on work carried by a reciprocating base, said fixture comprising a work support pivotally mounted adjacent one end thereof on the reciprocating base, stationary cam means located at one side of said base, a cam follower mounted on said base and adapted to follow the contour of said cam means during reciprocation of said base, and means actuated by the movement of said cam follower during reciprocation of said base to rotate said work support and the work carried thereby, whereby other than a flat surface will be produced by the operation of the tool on the work.

3. A fixture adapted to be applied to a machine wherein a tool performs an operation on work carried by a reciprocating base, said fixture comprising a work support pivotally mounted between the ends thereof on the reciprocating base, stationary cam means located at one side of said base, a cam follower mounted on said base and adapted to follow the contour of said cam means during reciprocation of said base, and means actuated by the movement of said cam follower during reciprocation of said base to rotate said work support and the work carried thereby, whereby other than a flat surface will be produced by the operation of the tool on the work.

4. A fixture adapted to be applied to a machine wherein a tool performs an operation on work carried by a reciprocating base, said fixture comprising a work support pivotally mounted on the reciprocating base, stationary cam means located at one side of said base past which said reciprocating base is adapted to move, a cam follower mounted on said base and adapted to follow the contour of said stationary cam means during reciprocation of said base, eccentric actuating means rotatably mounted adjacent said work support and adapted to be rotated during reciprocation of said base to rotate said work support about its pivot point, connecting means between said cam follower and said actuating means whereby movement of said cam follower along said cam means will rotate said actuating means and said work support, and adjusting means on said connecting means for adjusting the position of said actuating means thereby to regulate and control the amount of movement imparted to said work support.

5. A fixture adapted to be applied to a machine wherein a tool performs an operation on work carried by a reciprocating base, said fixture comprising a work support pivotally mounted on the reciprocating base, stationary cam means located at one side of said base and past which said reciprocating base is adapted to move, eccentrics rotatably mounted adjacent said work support and in contact with a portion of said work support, whereby rotation of said eccentrics will impart a rotary movement on said work support, an arm extending outwardly at one side of said reciprocating base and connected with said eccentrics to rotate said eccentrics upon rotation of said arm, and a cam follower adjacent the outer end of said arm adapted to follow the contour of said cam means during reciprocation of said base, whereby movement of said cam follower along said cam means will rotate said arm and the eccentrics connected thereto to rotate said work support as it is moved past said tool thereby to produce an irregular surface on the work.

6. A fixture adapted to be applied to a machine wherein a tool performs an operation on work carried by a reciprocating base, said fixture comprising a work support pivotally mounted on the reciprocating base, a stationary cam track angularly disposed at one side of said base, a cam follower mounted on said base and adapted to traverse said cam track during reciprocation of said base past the tool, means adjacent said work support and adapted to be actuated to rotate said work support about its pivot means, and means connecting said cam follower with said actuating means for the work support, whereby said actuating means will be actuated to rotate said work support by movement of said cam follower along said cam track.

7. In an apparatus for cutting curved or inclined plane surfaces having a cutting tool and a supporting base, a work support reciprocably and rockably mounted on said base for carrying work to be operated upon by said tool, means to reciprocate said support past said tool, a stationary cam track at one side of said base, an arm rotatably mounted at one end thereof on said support, a cam follower at the other end of said arm adapted to follow the path of said cam track and to rotate said arm during reciprocation of said support, and means rotatable with said arm for rocking said support during its reciprocation, whereby the tool will cut a surface on the work in accordance with the path of said cam track.

8. In an apparatus for cutting curved or inclined plane surfaces having a cutting tool and a supporting base, a work support reciprocably and rockably mounted on said base for carrying work to be operated upon by said tool, means to reciprocate said support past said tool, a stationary cam track at one side of said base, an arm rotatably mounted at one end thereof on said support, a cam follower at the other end of said arm adapted to follow the path of said cam track and to rotate said arm during reciprocation of said support, and eccentric means connected to and rotatable with said arm and positioned in contact with said support for rocking said support during its reciprocation, whereby the tool will cut a surface on the work in accordance with the path of said cam track and the eccentricity of said eccentric means.

9. In an apparatus for cutting curved or inclined plane surfaces having a cutting tool and a supporting base, a work support reciprocably and rockably mounted on said base for carrying work to be operated upon by said tool, means to reciprocate said support past said tool, a stationary cam track at one side of said base, an arm rotatably mounted at one end thereof on said support, a cam follower at the other end of said arm adapted to follow the path of said cam track and to rotate said arm during reciprocation of said support, eccentric means connected to and rotatable with said arm and positioned in contact with said support for rocking said support during its reciprocation, whereby the tool will cut a surface on the work in accordance with the path of said cam track and the eccentricity of said eccentric means, and means for adjusting the angular position of said eccentric means with respect to the axis of rotation of said arm, thereby to control the surface to be cut by the tool.

CHARLES F. ROOT.

REFERENCES CITED

The following references are of record in the file of this patent:

UNITED STATES PATENTS

| Number | Name | Date |
| --- | --- | --- |
| 264,628 | Cockfield et al. | Sept. 19, 1882 |
| 2,230,694 | Morris | Feb. 4, 1941 |
| 2,249,251 | Mentley | July 15, 1941 |
| 2,319,117 | Drummond | May 11, 1943 |

FOREIGN PATENTS

| Number | Country | Date |
| --- | --- | --- |
| 15,652 | Great Britain | July 5, 1911 |
| 567,746 | Great Britain | Mar. 1, 1941 |